United States Patent Office 3,505,207
Patented Apr. 7, 1970

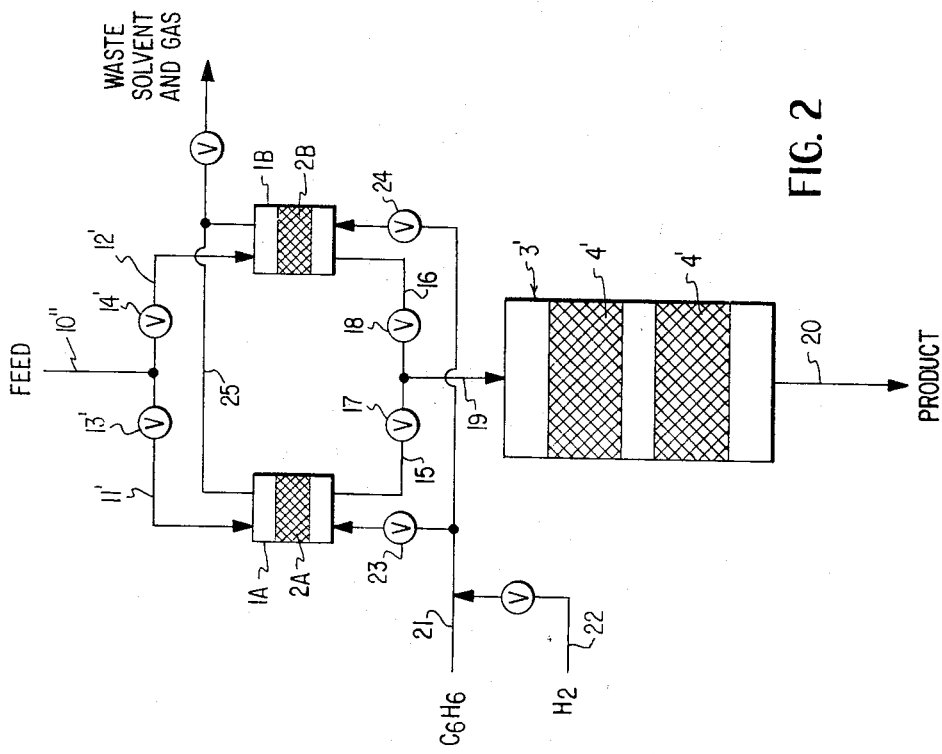
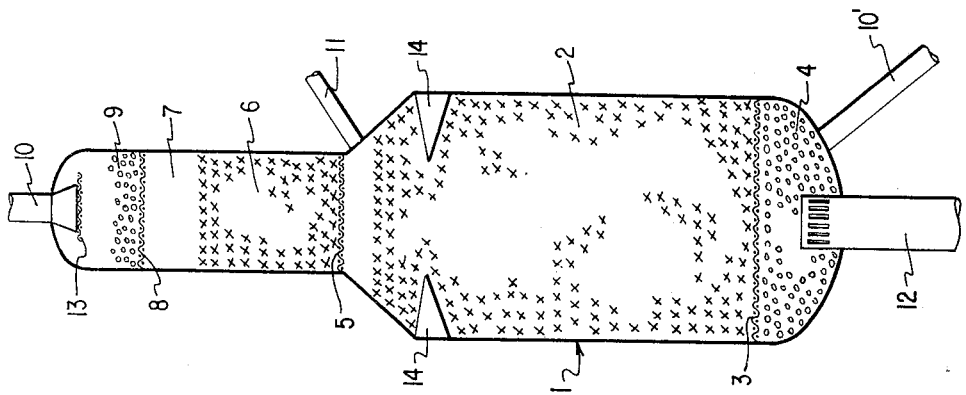

3,505,207
PROCESS FOR THE HYDROCRACKING OF
SHALE OILS
Stanley C. Haney, Homewood, Ill., and William H.
Decker, Darien, Conn., assignors to Sinclair Research, Inc., New York, N.Y., a corporation of
Delaware
Filed Apr. 4, 1968, Ser. No. 718,759
Int. Cl. C10g 13/02
U.S. Cl. 208—108                                24 Claims

ABSTRACT OF THE DISCLOSURE

Hydroconversion of raw, retorted shale oils by serial flow through a plurality of settled catalyst beds is improved by intermittently washing the initial catalyst bed with an aromatic hydrocarbon solvent. The wash is conducted under conditions which expand the catalyst bed and preferably in the presence of upflow hydrogen gas. The aromatic solvent can remove essentially completely the gummy, black, condensation products which form in the initial part of the first catalyst bed, causing excessive pressure drop and plugging the catalyst bed. The aromatic wash prolongs overall high catalyst activity by precluding or reducing the formation of coke by such deposits. Catalyst positioned subsequent to the initial bed can be washed as the need arises.

---

This invention relates to catalytic conversion of shale oil stocks. More particularly, the invention relates to a system for conducting catalytic hydroconversion of raw retorted shale oils, whereby fouling and plugging of the catalyst bed is minimized.

Under certain process conditions and catalyst system, shale oil may be hydroconverted to a product susceptible to a further refining using conventional petroleum processing to provide commercial products similar to those drived from petroleum crudes. Shale oil itself is not readily susceptible to such processing due to the complex cyclic structures which make up a substantial part of the raw oil. These complex materials tend to reduce the effectiveness of petroleum treating processes to an unattractive level. Further, raw shale oil contains considerable amounts of materials, such as sulfur and nitrogen compounds, metallic constituents, and the like, which rapidly poison some types of catalysts commonly used in petroleum processing. The expense of maintaining these catalysts active such conditions often precludes the treatment of shale oils by processing techniques common to the petroleum industry. Hydroconversion of shale oils has been found to modify them to an acceptable degree to permit conventional petroleum procesing of the hydrogenated shale oil products.

Retorted shale oil, when heated above a temperature of about 250° F., in the presence of hydrogen, will form a gummy, black, adhesive precipitate which will deposit on the catalyst contacted in hydroconversion processes. These deposits accumulate over a period of processing and foul catalyst disposed as a fixed bed, causing excessive pressure drop through the bed and subsequent shut-down of the reactor for regeneration of the catalyst. It is thought that these deposits are caused by the rupture of the complex cyclic structures in the oil, partial dealkylation of some molecules, and condensation to form high molecular weight, resin-like materials. These reactions are further complicated by the presence in the shale oil of considerable amounts of metal oxides and sulfides, and nitrogen, sulfur, and oxygenated organic compounds. In the course of processing, the deposits will tend to further condense to form coke. These deposited materials impair the catalytic activity in the reactor by excluding the reactants from the necessary contact with the catalyst. As more material deposits, the catalyst bed eventually becomes plugged so that the feed is less and less able to pass through the reactor, creating an excessive pressure drop.

As the catalyst bed becomes fouled and the effectiveness of the catalyst declines, it is common to take the reactor off-stream, remove entrained oil from the reactor and then regenerate the catalyst by introducing air or other oxygen-containing gas at high temperature to burn deposits from the catalyst. Oxidative regeneration of the catalyst is expensive and time consuming. It is therefore highly desirable to provide a fixed catalyst bed shale oil hydrogenation process which is capable of extended operation without excessive fouling of the catalyst.

One method which will reduce the operational difficulties caused by such catalyst fouling involves periodic washing of the catalyst with an aromatic hydrocarbon solvent under conditions causing expansion of the catalyst bed. This treatment is also time consuming thereby representing an economic loss, especially when the catalyst bed is large or a plurality of beds are involved whether alternatively on stream or arranged for serial flow.

We have found, however, that raw shale oils exhibit the property of depositing the undesirable deposits to a much greater extent in the initial portion of the first hydroconversion catalyst with which the oils come in contact at an elevated temperature, than in subsequent portions of the catalyst. Our present invention takes advantage of this selective deposition to reduce the overall cost and inconvenience of fixed or settled catalyst bed systems used for hydroconverting raw shale oils with periodic washing of the catalyst by an aromatic hydrocarbon solvent. In our procedure an initial catalyst bed is provided which can be washed more often than catalyst which is subsequently contacted with the shale oil. Thus in our system the raw shale oil first contacts an initial settled catalyst bed which is washed separately from remaining catalyst and the oil taken from the initial catalyst bed is subjected to further catalytic hydrotreatment.

The initial catalyst bed can be disposed in a separate reactor from the catalyst subsequent in the process line, especially where alternate initial reactors are used with one being on stream while another is undergoing washing. The initial catalyst bed may also be in the same reaction vessel as a subsequent portion of catalyst, and the separate catalysts may or may not be vertically displaced from each other, i.e. as physically separate beds. In any event, however, provision is made for washing the initial catalyst bed without necessarily washing the subsequently in line catalyst. Such physical separation is preferred to facilitate the distribution of the solvent over the total cross-section of the initial portion of catalyst.

The process of this invention can be operated with washing of only the initial catalyst bed but since there may be some, but slower, accumulation of deposits in the subsequently in line catalyst, the latter can also be similarly washed with an aromatic solvent as the need arises. The subsequently in line catalyst can be disposed as fixed or settled beds in one or more reactors in series with respect to shale oil flow, and the reactors may be connected for alternate operation between shale oil processing and washing. Moreover, it may be desirable to provide only alternate initial catalyst beds and then take the whole system off oil when the subsequent catalyst beds need washing. Provision can also be made to regenerate any of the catalyst beds when off-stream by the burning of carbonaceous deposits in the usual manner.

The amount of catalyst disposed in the initial catalyst bed is a minor weight amount of the total catalyst contacted by the shale oil undergoing hydroconversion at a given time. Thus the space velocity, i.e. weight of hydrocarbon per weight of catalyst per hour (WHSV) in the initial catalyst bed is more than twice the overall space velocity during a given operational period. The space velocity in the initial catalyst bed is often about 3 to 50 times the overall space velocity, preferably about 3 to 10 times the overall space velocity.

The deposits in the catalyst beds used in shale oil hydroconversion processes can be essentially completely removed by the in situ washing with aromatic hydrocarbon solvents, but the deposits are not soluble to any significant degree in aliphatic solvents. Washing of the initial catalyst beds according to the present invention is with upward flow of an aromatic hydrocarbon solvent at a rate sufficient to cause expansion of the catalyst bed. Washing of subsequently in line catalyst beds is preferably also by this upflow procedure, but it may not be necessary to vigorously wash the subsequent catalyst. It is often useful to supplement the solvent flow with a concurrent flow of hydrogen gas or an inert gas such as nitrogen or the like. It has further been found particularly effective to conduct washing of a given catalyst bed before a significant pressure drop across the bed has developed. In this fashion it is possible to remove extraneous materials from the catalyst before they condense to form insoluble coke.

The effective aromatic solvents for removing the shale oil deposits from the catalyst beds are those solvents which will dissolve the majority of the constituents of shale oil. The solvents boil essentially below about 800° F. and are preferably liquid at normal temperatures. Particular examples of desirable solvents include, for example, benzene, toluene, xylenes, and other relatively pure aromatic solvents. Additionally, highly aromatic petroleum streams, such as light cycle oils, e.g. boiling primarily in the range of about 400 to 650° F., aromatic extracts of such refinery streams as kerosene, diesel fuel, heating oil, and the like, obtained by treatment with solvents such as $SO_2$, furfural, and the like, are also effective. These aromatic extracts often contain about 20 to 95 percent aromatics, preferably at least about 90% aromatics. Usually the higher the aromatic content of such streams, the more the deposits will be soluble. While aromatic solvents will not dissolve coke or metallic constituents on the catalyst, a large proportion of such deposits can be flushed from the surface of the catalyst and out of the reactor by the action of the solvent. Excessive amounts of olefins in the solvent should be avoided since they may polymerize in the catalyst bed at elevated temperatures and pressures to form undesirable solids.

During the vigorous washing the solvent flows upwardly through the catalyst bed, for instance in the presence or absence of another fluid, at velocities sufficient to cause expansion of the bed, for instance by at least about 1, preferably at least about 5 or 10, volume percent. Bed expansion above about 50 volume percent are usually not necessary to provide adequate washing. As the velocity increases improved removal of contaminants from the catalyst bed can be obtained or the time required for a given extent of removal can be lessened, apparently due to increased agitation of the catalyst and better removal of fines from the catalyst bed. During the washing the solvent is below its critical temperature, but it may be above or below its critical pressure. Preferably, the solvent is in the liquid phase in the catalyst bed. The temperature during washing is preferably about 100 to 500° F., with little if any chemical conversion of wash solvent taking place. Elevated washing pressures are preferred, e.g. about 500 to 3000 p.s.i.g., which avoids the unnecessary depressuring of the reactor materially below the processing pressure, thereby also avoiding a temporary decrease in catalyst activity which has been noticed when washing at near atmospheric pressure.

The cycle times, i.e., the lengths of the processing or on stream and the washing or off stream periods, can depend on various factors such as the extent and nature of the carbonaceous and metallic contaminants deposited on the catalyst bed due to the characteristic of the raw shale oil feed, the processing and washing temperatures and pressures employed, the nature and velocity of the wash solvent, and the permissible decrease in catalyst activity and increase in bed plugging and pressure drop the operation can economically endure. Processing cycles for an initial catalyst bed should be long enough to give a significant deposition of materials in the bed and periods of at least about 6 hours, preferably at least about 1 day, duration seem indicated for reasons of economy. Processing times of at least about 3 days or even at least about 6 days are preferred for the initial catalyst bed, especially in systems where processing of the shale oil must be interrupted to wash the catalyst bed. Generally, a plurality of initial catalyst bed washings are effected before subsequent beds are washed, preferably the total initial bed washings outnumber the washing of any given subsequent catalyst bed by several fold, e.g. at least about 4 times. Washing periods are often at least about 1 hour, preferably at least about 6 hours, to give substantial to even essentially expansions on the order of about 5 to 50 volume percent. In such operations, the washed catalyst particles may still contain metal or carbonaceous contaminants, and the wash medium may not, in many operations, contain any significant amount of catalyst fines.

The catalyst employed in the hydroconversion process can be the various sulfur-resistant catalyst often employed in the treatment of heavy petroleum oils and also referred to an hydrogenation-dehydrogenation catalysts. Examples of suitable catalytic metal components include the members of Group VI-B in the Periodic Table, i.e. chromium, molybdenum and tungsten; vanadium; and the iron group metals of Group VIII, especially cobalt and Nickel. Generally these metals are supported, e.g., on conventional refractory oxide catalyst supports such as alumina, silica, magnesia, zirconia, etc. and mixtures thereof and partially crystalline materials such as crystalline alumino-silicates of the various types known in the art, and the metals are present in catalytically effective amounts, for instance about 2 to 30 weight percent, in the form of the oxides, sulfides or other compounds thereof. Mixtures of these materials or compounds of two or more of the oxides or sulfides can be employed, for example, mixtures or compounds of the Group VIII metal oxides or sulfides with the oxides or sulfides of Group VI-B constitute very satisfactory catalysts. Examples of such mixtures or compounds are nickel molybdate, tungstate or chromate (or thiomolybdate, thiotungstate or thiochromate) or mixtures of nickel and/or cobalt oxides with molybdenum, tungsten or chromium oxides. As the art is aware, these catalytic ingredients are generally employed while disposed upon a suitable carrier of the solid oxide refractory type, e.g., a predominantly calcined or activated alumina or silica-alumina, which can be mainly silica especially in hydroconverting catalysts. Commonly employed catalysts have about 1 to 10% of a Group VIII metal and 5 to 25 of a Group VI-B metal (calculated as the oxide).

It has been found that macrosize catalyst particles of about $\frac{1}{64}$ to $\frac{1}{2}$ or more inch in diameter preferably about $\frac{1}{16}$ to $\frac{1}{4}$ inch in diameter, and lengths of similar dimensions or up to about 1 inch or somewhat more, can be used in our catalyst beds. While particles of various shapes can be used and can be washed free of deposits, the spherical form has fewer objectional features, such as bridging, and is easier to set in a circulatory top-to-bottom bed motion during the bed wash cycle. Additionally, the spherical particles tend to form a relatively uniform packing upon settling, minimizing the void space between particles.

The present invention will now be described with reference to a representative shale oil hydrogenation system shown in the drawings. FIGURE 1 shows a reactor particularly suited to processing in accordance with the present invention.

FIGURE 2 shows another processing technique which may be operated essentially continuously, with two guard reactors provided in parallel for swing reactor type operation, followed by a larger primary reactor.

FIGURE 1 shows a reactor 1, which is best described as a bottle reactor with features for washing the fixed catalyst bed. The main body of the catalyst is contained in the lower section of the "bottle" 2, supported on screen 3 which in turn rests on several feet of inert alundum spheres 4. The spheres are preferably about ½ to ¾ inch in diameter. Another screen 5, suitably supported, is placed at the top of the main catalyst bed 2 and supports another bed of catalyst 6 in the "neck" portion of the "bottle." The upper catalyst section occupies from about ½ to ⅘ of the volume of the upper section of the reactor, while about ⅒ to ¼ of the upper section is a void volume. At the top of the void space, screen 8 supports an additional layer of inert alundum spheres 9 which may range in size from about ¼ to 1 inch or even larger. The foregoing arrangement is particularly adapted to processing shale oils with intermittent washing of the top section of the reactor bed. The dimensional ratios given in Table I give satisfactory results, both in oil processing and washing of the catalyst bed.

TABLE I

|  | Range | Preferred |
|---|---|---|
| Vessel diameter, bottom:top | 1.5–6:1 | 2–4:1 |
| Length: diameter ratio: | | |
| Top section | 2–20:1 | 5–10:1 |
| Bottom section | 2–10:1 | 3–6:1 |
| Catalyst volume ratio, bottom:top | 1–20:1 | 3–10:1 |

During the oil process cycle, raw retorted shale oil enters the reactor through line 10, hits distribution plate 13, flows down through the top section of the catalyst 6, where the major part of the deposits form, hits redistribution plate 14, which extends around the periphery of the reactor, or any other suitable redistribution means to prevent oil flow directly down the wall of the reactor, and then passes downwardly through the main catalyst bed 2, and out through outlet line 12.

The wash cycle can be conducted in the following manner, still with reference to the figure: shale oil feedstock is stopped and the reactor is drained through line 12, aided by a purge flow of hydrogen or an inert gas if desired. Benzene the preferred solvent, or other aromatic solvent as described above, is introduced through inlet line 10' and the reactor 1 is filled until it overflows into line 10, at which time the wash solvent flow may be halted. A hydrogen-rich gas, such as naphtha reformer off-gas, is introduced through line 11, from whence it flows upward through the upper catalyst bed 6. The catalyst bed in the upper section can be expanded to such an extent that particles from the top of the bed will strike screen 8, or, if desired or necessary and if adequate gas is available, the entire upper section may be agitated in such a manner that a top to bottom circulatory motion of the catalyst particles may be obtained. The void upper section of the reactor provides necessary space for the motion of the particles and the consequent expansion of the upper catalyst bed 6, where the aforementioned gummy condensation products are deposited. After a suitable period of washing, the dirty solvent and gummy deposit are flushed through line 10 with fresh solvent. After 50 to 100 percent of the solvent is displaced, a second wash cycle is begun. The wash cycles may be repeated until the displaced solvent is clean. When essentially all the gummy material is removed, the solvent will appear as clear or a light straw color, indicating a clean catalyst. A continuous upflow of solvent at an appropriate mass velocity to agitate the catalyst bed may replace the hydrogen gas flow in part or completely. Other gases, e.g., nitrogen, carbon dioxide, flue gas and the like may also be utilized in place of hydrogen. Upon completion of the wash cycle, the solvent is drained from the reactor through line 10' or line 12. The used solvent may be recovered by decantation, fractionation, or any other of the methods known in the art.

In the washing cycle the upward flow of the wash solvent and the hydrogen or other gas at a suitable rate to expand the catalyst bed serves to promote contact between the solvent and the catalyst particles. In addition, the motion produces a scouring motion on the catalyst particles. The random movement of the catalyst causes the particles to rub against one another and against the wall of the reactor. This scouring action serves to loosen and remove the deposits from the catalyst and assist in dissolving or flushing away of these materials by the solvent. In this fashion, even the heaviest and least soluble materials deposited on the catalyst are flushed away.

The processing cycles which generally precede and follow the washing stage of the method of this invention employ a settled catalyst bed and serve to convert the shale oils and their fractions in the presence of free or molecular hydrogen fed to the reaction zone. The oils can be whole oils or distilled or residual portions thereof. Shale oils can be obtained as the result of retorting oil shales. The temperatures of the hydroconversion are elevated, usually being in the range of about 500 to 1000° F., often about 700 to 950° F. The oil may or may not undergo any substantial cracking during the conversion. Thus in typical denitrogenation operations cracking to hydrocarbon materials boiling lower than the initial boiling point of the hydrocarbon feed can be less than about 5 or even less than about 2 weight percent. On the other hand in a system designated for hydrocracking, the product may contain at least about 40 weight percent of hydrocarbon materials boiling below the initial boiling point of the hydrocarbon feed. The extent of cracking obtained in any of these operations can be as desired. Other reactions conducted in typical hydroconversion systems include hydrosulfurization, hydrogenation and dehydrogenation. Elevated pressures are normally employed in the various hydroconversion operations, e.g., about 300 to 5000 p.s.i.g., preferably about 500 to 3000 p.s.i.g., with the hydrogen rate being at least about 500, preferably about 1500 to 12,000 standard cubic feet per barrel of hydrocarbon feed. Suitable space velocities are in the range of about 0.1 to 15, preferably about 0.5 to 8, WHSV. Reactors are ordinarily restricted in commercial usage to about 100 feet maximum height due to various mechanical limitations. It can be desirable to maintain the length/diameter ratio within a range of about 2 to 25, preferably 10 to 20, for the most effective results. Also the reactors can be equipped to regenerate the catalyst by carbon burnoff.

FIGURE 2 illustrates an essentially continuous manner for processing shale oils utilizing the catalyst wash techniques of the present invention. Continuous processing is accomplished by providing separate guard reactors before the primary reaction zone. The guard reactors, of which there can be two or more, are disposed in parallel for operation in the familiar swing reactor fashion. In such an operation, one or more reactors will be in the processing stream for the conversion of the shale oil, while at least one guard reactor is in the wash cycle. Such operation is particularly effective, since the materials which are deposited during shale oil processing, and which are removed by the catalyst wash techniques of the present invention, are formed in the initial part of the catalyst, i.e., in the guard reactor, and very little of such deposits form in the subsequent primary conversion zone. As a guard reactor becomes fouled and the pressure differential increases, it may then be replaced by another guard reactor and, when removed from the process stream, subjected to the catalyst wash technique of the present invention to remove the shale oil conversion deposits and to restore the pressure differential of the reactor essentially to its original level.

Referring now with particularity to FIGURE 2, the process of the present invention can be operated in the following manner:

Whole shale oil is passed through line 10″ and 11′ to guard reactor 1A, valve 13′ being open. In guard reactor 1A, the shale oil is contacted with catalyst bed 2A under shale oil conversion conditions, as hereinbefore described. The space velocity in the guard reactor is preferably high, e.g. about 8 to 15 WHSV. While guard reactor 1A is in the process stream, line 12′ remains closed, by closing valve 14′, and no feed passes to guard reactor 1B or to catalyst bed 2B. Valve 18 also is closed to preclude backflow through line 16 to guard reactor 1B. The effluent from guard reactor 1A passes through line 15, open valve 17, and line 19, into the primary reactor 3′ containing shale oil conversion catalyst in fixed bed or beds 4′; reactor 3′ is maintained at shale oil conversion conditions described above, and the converted product is removed from the system via line 20. Processing can be continued at shale oil conversion conditions until the pressure differential across the guard reactor, 1A, begins a substantial increase, or until plugging conditions are approached. Guard reactor 1A is then replaced with guard reactor 1B by opening valves 14 and 18 and closing valves 13′ and 17. The shale oil feed then passes through line 12′ to guard reactor 1B, where it is contacted with catalyst bed 2B at shale oil conversion conditions and the effluent from reactor 1B then passes via line 16, valve 18, and line 19 to primary conversion reactor 3′ as before.

Guard reactor 1A is then subjected to the catalyst bed washing technique of the present invention. The reactor is cooled to a convenient wash temperature, e.g., about 100° F., for example, and drained of shale oil. With valve 23 open, aromatic wash solvent, e.g. benzene, is introduced through line 21 until the reactor is filled. A hydrogen-rich gas is passed through line 22 into the system, and the solvent and gas pass upwardly through the reactor at a velocity sufficient to expand the catalyst bed by about 5 to 50 volume percent. The washing can be conducted with continuous flow of solvent concurrently with the gas, or the liquid flow can be the only bed agitating force. Dirty solvent and gas, together with disolved and suspended deposits from the catalyst are displaced, either continuously or intermittently, from the reactor via line 25 and valve 26. When the displaced solvent appears clear or a light straw-yellow, a clean catalyst is indicated. The solvent is then removed from the reactor, which is then held in readiness for replacement in the processing stream, when guard reactor 1B becomes fouled. When the pressure differential in reactor 1B begins a substantial increase, it is then replaced and washed in the same manner. Since essentially all the black, gummy deposits form in the guard reactors, continuous operation may be maintained for substantial periods by processing alternately in the two guard reactors without interruption of operation of the primary reactor. Preferably, the guard reactors will each be passed through at least about 5 process-wash cycles before any substantial increase in the presure differential occurs. Ordinarily it will not be necessary to wash the primary reactor until it becomes necessary or desirable to regenerate the catalyst, by burning carbon deposits therefrom, although the primary reactor catalyst may be washed if the pressure drop across the bed becomes uneconomically great before regeneration is necessary. In any event, the wash technique of the present invention can desirably be conducted in the primary reactor as a highly effective first step in the regeneration of the catalyst.

Whether utilized in connection with processing in a bottle reactor or with swing-operation type guard reactors, or in any other processing operation, the catalyst bed wash of the present invention affords a highly desirable and effective adjunct to the catalytic conversion of whole shale oils, as is evident from the following, non-limiting examples:

EXAMPLE I

Shale oil is treated over a 100 gm. charge of a calcined extrudate, having a diameter of $\frac{1}{16}$ inch, of nickel and tungsten sulfides supported on a crystaline alumino silicate base. The base was prepared by combining a silica-alumina hydrogel with amorphous hydrous alumina and a hydrogen-exchanged crystalline alumino silicate. The crystalline alumino silicate comprises 5 weight percent of the combination and has a pore size of about 13 A. and a $SiO_2$ to $Al_2O_3$ ratio of about 3.5:1. The mixture is dried at about 230 to 600° F., and then calcined at about 950° F. for about one hour. The nickel and tungsten sulfides are present on the base in an amount of 8 weight percent nickel and 18 weight percent tungsten. The catalyst forms a fixed bed about 10″ deep and a tubular reactor 1″ in diameter. The shale oil has the following properties:

| | |
|---|---|
| Gravity, ° API | 20.0 |
| Pour point, ° F. | +85 |
| Nitrogen, weight percent | 2.2 |
| Sulphur | 0.66 |
| Carbon residue, weight percent | 3.5 |
| Boiling range: | |
| IBP | 421 |
| 5% | 482 |
| 10% | 523 |
| 30% | 671 |
| 50% | 792 |
| 80% | 966 |
| 83% | 1036 |

The shale oil is processed at the following average conditions:

| | |
|---|---|
| Temperature, ° F. | 850 |
| Pressure, p.s.i.g. | 2,500 |
| WHSV | 2.0 |
| Hydrogen rate, s.c.f./b. | 12,000 |

At the initiation of processing the pressure drop across the reactor catalyst bed is essentially zero p.s.i. At the end of 250 hours of continuous processing time the differential pressure has risen to about 100 p.s.i. which is considered to be plugged to a significant extent. The rate of fouling is unsatisfactory for commercial processing.

EXAMPLE II

Another processing operation using the same feed stock and reactor as in Example I and utilizing a 100 gm. charge of a nickel-molybdena-alumina (3.5 wt. percent Ni and 15 wt. percent $M_0O_3$) catalyst is conducted under the following conditions:

| | |
|---|---|
| Temperature, ° F. | 850 |
| Pressure, p.s.i.g. | 1,000 |
| WHSV | 10.0 |
| $H_2$ rate, s.c.f./b. | 10,000 |

Processing is continued for 132 hours or until the pressure differential across the reactor has risen to about 100 p.s.i.g. The effluent from the reactor is collected and used as feedstock in a second run using a 100 gm. charge of the catalyst of Example I under the following conditions:

| | |
|---|---|
| Temperature, ° F. | 850 |
| Pressure, p.s.i.g. | 2,500 |
| WHSV | 2.0 |
| $H_2$ rate, s.c.f./b. | 12,000 |

At the end of about 400 hours of continuous processing when the feedstock derived from the first stage treatment is depleted, there is still no evidence of any rise in the differential pressure across the reactor in the second operation.

These data indicate that the plugging takes place in the initial processing of the shale oil, that is in the top of a reactor bed, or in the first reactor of a plurality and that once the material described has been deposited, few problems are encountered in subsequent catalytic hydrotreating.

EXAMPLE III

A series of processing operations is conducted to illustrate the effect of the catalyst bed washing technique of the present invention. A 100 gm. charge of the catalyst of Example I is contacted with the shale oil of Example I at the following conditions:

| | |
|---|---:|
| Temperature, °F. | 850 |
| Pressure, p.s.i.g. | 2,500 |
| WHSV | 2.0 |
| $H_2$ rate, s.c.f./b. | 12,000 |

After about 200 hours of continuous processing time a distinct rise in the rate of the differential pressure drop is noted. This is interpreted as indicative of approaching plugging conditions. Oil flow is stopped at this point and the reactor is cooled to 100° F. Benzene is introduced into the reactor at about 2000 p.s.i.g. under upflow conditions at a slow rate. The solvent flow rate is gradually increased up to 1 liter per minute over a period of 10 minutes, at which time hydrogen gas is introduced by upflow at a rate of 750 cc./minute. Under these conditions the catalyst bed is expanded by about 10 to 20 percent.

The washing procedure is continued for 30 minutes. The reactor is then drained and processing of the shale oil is resumed. At the point of resumption the differential pressure drop across the reactor is again essentially zero. The processing-washing cycle is repeated. At the end of the second cycle wash processing is resumed, again with a differential pressure of essentially zero, and is continued for 265 hours when the bed differential pressure attains 100 p.s.i.g. or plugging conditions. It is important to note that the procedure followed in the present example is effective to essentially completely remove the deposits from the catalyst bed, to the extent that processing can be continued for about the same length of time on the washed catalyst as is possible with virgin catalyst.

EXAMPLE IV

The shale oil from Example I is continuously processed utilizing the following procedure:

Shale oil feedstock is passed alternately to one of two parallel swing operation type guard reactors. The effluent from the guard reactors is then processed in a primary reactor connected in series to each of the guard reactors. In the guard reactors the catalyst is a nickel-molybdena-alumina hydrotreating catalyst as described in the first hydrotreatment in Example II. The operating conditions in the guard reactors are maintained during processing as follows:

| | |
|---|---:|
| Temperature, °F. | 850 |
| Pressure, p.s.i.g. | 1,000 |
| WHSV | 10.0 |
| $H_2$ rate, s.c.f./b. | 10,000 |

The guard reactor effluent is then passed to a primary reactor utilizing the catalyst of Example I maintained at the following conditions:

| | |
|---|---:|
| Temperature, °F. | 850 |
| Pressure, p.s.i.g. | 2,500 |
| WHSV | 2.0 |
| $H_2$ rate, s.c.f./b. | 12,000 |

The catalyst is apportioned between each of the guard reactors and the primary reactor in a weight ratio of 1:5. The two guard reactor catalyst beds are each smaller than the primary reactor catalyst bed. The guard reactors are each one inch in internal diameter, containing a charge of 50 grams of catalyst; the primary reactor has a two inch internal diameter and contains a catalyst charge of 250 grams.

In the operation of the process each guard reactor is maintained on stream for a period of about 120–125 hours, or until an increase in the differential pressure drop across the reactor is noted. The reactor in use is then taken off stream and replaced by the second guard reactor. The off-stream reactor is then treated to remove the deposits by washing in the following manner:

The reactor is cooled to about 100° F. and benzene is introduced by upflow at about 2000 p.s.i.g. and a very slow rate. The rate of solvent flow is gradually increased over a period of about 10 minutes to a flow of about 1 liter per minute at which time hydrogen gas is introduced upflow at a rate of about 0.75 liter per minute. The wash flow rates are sufficient to produce an expansion of the bed of about 10–20 percent. The washing was continued for 30 minutes and the reactor then drained. The clean reactor was then held under pressure until required for replacement in the processing stream.

The alternation of guard reactors is continued for about 5 cycles at which time the differential pressure drop across the primary reactor has risen to about 100 p.s.i. At this time the entire processing is discontinued, and the primary reactor as well as the guard reactor in use at that stage are washed. In accomplishing adequate expansion of the catalyst bed in the primary reactor a benzene solvent flow of about 4.5 liters per minute and a hydrogen upflow rate of about 2.5 liters per minute are required. The washing of the primary reactor is continued for about 60 minutes. The processing is then resumed and upon initiation of shale oil flow to the primary reactor, the differential pressure drop across the catalyst bed is found again to be essentially zero.

It is claimed:

1. A process for the hydroconversion of shale oil which comprises contacting said oil at an elevated, hydroconversion temperature in the presence of hydrogen, with a settled, fixed bed of macrosize hydroconversion catalyst, there being initial and subsequent portions of said catalyst, continuing such hydroconversion contacting to deposit constituents of the shale oil in the initial portion of the catalyst, discontinuing said contacting of said portion of the catalyst with shale oil, subjecting the resulting contaminated initial portion of the catalyst bed to an upward flow of an aromatic hydrocarbon solvent boiling below about 800° F. under conditions which expand the initial portion of the catalyst, but not a subsequent portion of the catalyst, beyond its settled volume and at a temperature below the critical temperature of said solvent to remove contaminants from the initial portion of catalyst, removing solvent from the catalyst, and again conducting said hydroconversion by contacting said initial portion in settled form, and then said subsequent portion of catalyst with said shale oil.

2. The process of claim 1 wherein said aromatic hydrocarbon is normally liquid.

3. The process of claim 2 wherein said liquid hydrocarbon is benzene.

4. The process of claim 1 wherein said hydroconversion effects denitrogenation of the shale oil with there being in the product less than about 5 weight percent of hydrocarbons boiling below the initial boiling point of the shale oil feed.

5. The process of claim 1 wherein said hydroconversion is hydrocracking with there being in the product at least about 40 weight percent of hydrocarbons boiling below the initial boiling point of the shale oil feed.

6. The process of claim 1 wherein said initial portion of the catalyst is expanded about 5 to 50 volume percent of its settled volume while being subjected to said upward flow of aromatic solvent.

7. The process of claim 1 wherein said upward flow of solvent is conducted in the presence of a concurrent upward flow of a hydrogen-containing gas.

8. A process for the treatment of shale oils which comprises contacting said oil at about 700 to 950° F.

and a pressure of about 300 to 5000 p.s.i.g. in the presence of hydrogen, with a settled, fixed bed of macrosize hydroconversion catalyst, there being an initial and subsequent portion of said catalyst, for a period of at least about six days whereby constituents of the shale oil are deposited in the initial portion of the catalyst, discontinuing said contact of the said initial portion of the catalyst and shale oil, washing the said initial portion only of the catalyst bed with an upflowing stream of normally liquid, aromatic hydrocarbons at a temperature of about 100 to 500° F. under conditions which cause an expansion of the said initial portion only of the catalyst bed of at least about 5 volume percent to remove from the said initial portion of the catalyst bed contaminants resulting from the treatment of said shale oil, and resuming said treatment of shale oil in contact with a settled bed of the washed catalyst.

9. The process of claim 8 in which the aromatic hydrocarbon is in the liquid phase during said washing and the washing is conducted for at least about 1 hour.

10. The process of claim 9 in which the aromatic hydrocarbon is benzene.

11. The process of claim 9 in which the said initial portion of the bed is expanded by about 5 to 50 volume percent during washing.

12. The process of claim 11 in which the pressure during washing is about 500 to 3000 p.s.i.g.

13. The process of claim 12 in which the aromatic hydrocarbon is benzene.

14. The process of claim 13 wherein the hydroconversion effects denitrogenation of the shale oil with there being in the hydrocarbon product less than about 5 weight percent of hydrocarbons boiling below the initial boiling point of the shale oil feed.

15. The process of claim 13 wherein the hydroconversion is hydrocracking with there being in the hydrocarbon product at least about 40 weight percent of hydrocarbon materials boiling below the initial boiling point of the shale oil feed.

16. A process for the hydroconversion of shale oil which comprises contacting said oil, at an elevated, hydroconversion temperature in the presence of hydrogen, with a plurality of settled, fixed beds of macrosize hydroconversion catalyst in a plurality of hydroconversion reactors, including an initial catalyst bed in an initial reactor and a subsequent catalyst bed in a subsequent reactor, continuing said hydroconversion contacting to deposit constituents of the shale oil in the initial reactor, discontinuing said contacting in the initial reactor containing deposits, subjecting the initial catalyst bed to an upward flow of an aromatic hydrocarbon solvent boiling below about 800° F. at conditions which expand the catalyst bed by at least about 5 percent of its settled volume at a temperature below the critical temperature of the solvent, to remove the deposits of constituents of the shale oil, discontinuing said solvent flow and removing solvent from said reactor, and resuming said contacting of shale oil with the settled bed of the washed catalyst.

17. The process of claim 16 in which the aromatic hydrocarbon is in the liquid phase during said washing and the washing is conducted for at least about 1 hour.

18. The process of claim 16 in which the aromatic hydrocarbon is benzene.

19. The process of claim 16 in which the bed is expanded by about 5 to 50 volume percent during washing.

20. The process of claim 16 in which the pressure during washing is about 600 to 3000 p.s.i.g.

21. The process of claim 16 in which the aromatic hydrocarbon is benzene.

22. The process of claim 16 wherein the hydroconversion effects denitrogenation of the shale oil with there being in the hydrocarbon product less than about 5 weight percent of hydrocarbons boiling below the initial boiling point of the shale oil feed.

23. The process of claim 16 wherein the hydroconversion is hydrocracking with there being in the hydrocarbon product at least about 40 weight percent of hydrocarbon materials boiling below the initial boiling point of the shale oil feed.

24. The process of claim 16 wherein said plurality of settled, fixed-beds of macrosized hydroconversion catalyst in a plurality of hydroconversion reactors includes two initial catalyst beds in two initial reactors in which the hydroconversion of the shale oil occurs and in which the hydroconversion of the said shale oil occurs in the second of said initial reactors while the first and said initial reactors is subjected to the upward flow of the aromatic hydrocarbon solvent after use of the said first reactor for said hydroconversion and while said hydroconversion is taking place in said second reactor.

References Cited

UNITED STATES PATENTS

| | | | |
|---|---|---|---|
| 2,658,933 | 11/1953 | May et al. | 252—414 |
| 1,933,508 | 10/1933 | Peck | 208—108 |
| 2,346,652 | 4/1944 | Alther | 252—414 |
| 2,985,582 | 5/1961 | Oettinger | 208—108 |
| 3,207,689 | 9/1965 | Van Driesen | 208—108 |

DELBERT E. GANTZ, Primary Examiner

ABRAHAM RIMENS, Assistant Examiner

U.S. Cl. X.R.

252—414; 208—254

UNITED STATES PATENT OFFICE
CERTIFICATE OF CORRECTION

Patent No. 3,505,207      Dated April 7, 1970

Inventor(s) STANLEY C. HANEY AND WILLIAM H. DECKER

It is certified that error appears in the above-identified patent and that said Letters Patent are hereby corrected as shown below:

Claim 24, line 7 thereof, delete "and" and insert therefor --of--.

SIGNED AND SEALED
SEP 1 - 1970

(SEAL)
Attest:

Edward M. Fletcher, Jr.
Attesting Officer

WILLIAM E. SCHUYLER, JR.
Commissioner of Patents